(12) United States Patent
Tsukamoto

(10) Patent No.: US 9,608,852 B2
(45) Date of Patent: Mar. 28, 2017

(54) BASE-STATION CONTROL DEVICE, WIRELESS COMMUNICATION SYSTEM, AND BASE STATION

(71) Applicant: Mitsubishi Electric Corporation, Chiyoda-ku (JP)

(72) Inventor: Kaoru Tsukamoto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/763,632

(22) PCT Filed: Mar. 14, 2014

(86) PCT No.: PCT/JP2014/056909
§ 371 (c)(1),
(2) Date: Jul. 27, 2015

(87) PCT Pub. No.: WO2014/171242
PCT Pub. Date: Oct. 23, 2014

(65) Prior Publication Data
US 2016/0013964 A1 Jan. 14, 2016

(30) Foreign Application Priority Data
Apr. 18, 2013 (JP) ................. 2013-087604

(51) Int. Cl.
*H04M 1/00* (2006.01)
*H04B 1/38* (2015.01)
(Continued)

(52) U.S. Cl.
CPC ...... *H04L 27/2689* (2013.01); *H04J 11/0053* (2013.01); *H04L 27/2646* (2013.01)

(58) Field of Classification Search
CPC .............. H04J 11/0053; H04L 27/2646; H04L 27/2689
(Continued)

(56) References Cited

U.S. PATENT DOCUMENTS 8,179,926 B2    5/2012  Futami et al.
2007/0058683 A1  3/2007  Futami et al.
(Continued)

FOREIGN PATENT DOCUMENTS

JP    2007-81952 A    3/2007
JP    2010-541338 A   12/2010
(Continued)

OTHER PUBLICATIONS

Office Action issued on Feb. 2, 2016 in Japanese Patent Application No. 2015-512359 with partial English translation.
(Continued)

*Primary Examiner* — Eugene Yun
(74) *Attorney, Agent, or Firm* — Oblon, McClelland, Maier & Neustadt, L.L.P.

(57) ABSTRACT

A control station serving as a base-station control device that issues an operation instruction to each of base stations in a wireless communication system in which a plurality of base stations perform transmission at the same time and the same frequency, wherein a frequency offset of a reception signal from a mobile station that is detected by each of the base stations is collected, and a phase rotation amount that is a rotation amount when the base stations rotate a phase of a transmission signal is determined for each of the base stations so that frequency offsets of the respective transmission signals having been subjected to phase rotation by the respective base stations are the same.

7 Claims, 4 Drawing Sheets

(51) Int. Cl.
*H04L 27/26* (2006.01)
*H04J 11/00* (2006.01)

(58) Field of Classification Search
USPC .......................................................... 455/561
See application file for complete search history.

(56) References Cited

U.S. PATENT DOCUMENTS

| | | |
|---|---|---|
| 2009/0080386 A1 | 3/2009 | Yavuz et al. |
| 2009/0080499 A1 | 3/2009 | Yavuz et al. |
| 2009/0081970 A1 | 3/2009 | Yavuz et al. |
| 2009/0082026 A1 | 3/2009 | Yavuz et al. |
| 2009/0082027 A1 | 3/2009 | Yavuz et al. |
| 2009/0086861 A1 | 4/2009 | Yavuz et al. |
| 2011/0158164 A1 | 6/2011 | Palanki et al. |
| 2012/0128089 A1 | 5/2012 | Tsutsui |
| 2014/0378146 A1 | 12/2014 | Yavuz et al. |

FOREIGN PATENT DOCUMENTS

| | | |
|---|---|---|
| JP | 4699843 B2 | 6/2011 |
| JP | 2012-004609 A | 1/2012 |
| JP | 2012-085237 A | 4/2012 |
| JP | 2012-109892 A | 6/2012 |
| JP | 2012-527854 A | 11/2012 |
| WO | WO 2011/158726 A1 | 12/2011 |
| WO | WO 2012/049859 A1 | 4/2012 |

OTHER PUBLICATIONS

International Search Report issued May 27, 2014, in PCT/JP2014/056909, filed Mar. 14, 2014.
Extended European Search Report issued Nov. 7, 2016 in Patent Application No. 14785503.5.
CATT: "Considerations on DL CoMP Schemes", 3GPP Draft; R1-112955, vol. RAN WG1. No. Zhuhai; Oct. 10, 2011, Oct. 4, 2011, XP050538161, [retrieved on Oct. 4, 2011].

FIG.3

| | FREQUENCY OFFSET VALUE DETECTED FROM RECEPTION SIGNAL FROM MOBILE STATION $30_j$ BY BASE STATION $10_i$ $fest_{i,j}$ | TRANSMISSION PHASE-ROTATION AMOUNT OF BASE STATION $10_i$ (FREQUENCY REPRESENTATION) $frot_i$ | TRANSMISSION FREQUENCY ERROR OF THE BASE STATION $10_i$ AFTER TRANSMISSION-SIGNAL PHASE-ROTATION $e'_{BSi}$ |
|---|---|---|---|
| BASE STATION $10_{m-2}$ | $fest_{m-2,\,m}=e_{BSm-2}-e_{MSm}+fd_m$ | $-fest_{m-2,\,m}$ | $e_{BSm-2}+frot_{m-2}=e_{MSm}-fd_m$ |
| BASE STATION $10_{m-1}$ | $fest_{m-1,\,m}=e_{BSm-1}-e_{MSm}+fd_m$ $fest_{m-1,\,m+1}=e_{BSm-1}-e_{MSm+1}+fd_{m+1}$ | $-fest_{m-1,\,m}$ | $e_{BSm-1}+frot_{m-1}=e_{MSm}-fd_m$ |
| BASE STATION $10_m$ | $fest_{m,\,m}=e_{BSm}-e_{MSm}+fd_m$ $fest_{m,\,m+1}=e_{BSm}-e_{MSm+1}+fd_{m+1}$ $fest_{m,\,m+2}=e_{BSm}-e_{MSm+2}+fd_{m+2}$ | $-fest_{m,\,m}$ | $e_{BSm}+frot_m=e_{MSm}-fd_m$ |
| BASE STATION $10_{m+1}$ | $fest_{m+1,\,m+1}=e_{BSm+1}-e_{MSm+1}+fd_{m+1}$ $fest_{m+1,\,m+2}=e_{BSm+1}-e_{MSm+2}+fd_{m+2}$ $fest_{m+1,\,m+3}=e_{BSm+1}-e_{MSm+3}+fd_{m+3}$ | $frot_{m-1}+fest_{m-1,\,m+1}$ $-fest_{m+1,\,m+1}$ $=e_{MSm}-e_{BSm+1}-fd_m$ | $e_{BSm+1}+frot_{m+1}=e_{MSm}-fd_m$ |
| BASE STATION $10_{m+2}$ | $fest_{m+2,\,m+2}=e_{BSm+2}-e_{MSm+2}+fd_{m+2}$ $fest_{m+2,\,m+3}=e_{BSm+2}-e_{MSm+3}+fd_{m+3}$ $fest_{m+2,\,m+4}=e_{BSm+2}-e_{MSm+4}+fd_{m+4}$ | $frot_m+fest_{m,\,m+2}$ $-fest_{m+2,\,m+2}$ $=e_{MSm}-e_{BSm+2}-fd_m$ | $e_{BSm+2}+frot_{m+2}=e_{MSm}-fd_m$ |
| BASE STATION $10_{m+x}$ | $fest_{m+x,\,m+x}=e_{BSm+x}-e_{MSm+x}+fd_{m+x}$ $fest_{m+x,\,m+x+1}=e_{BSm+x}-e_{MSm+x+1}+fd_{m+x+1}$ $fest_{m+x,\,m+x+2}=e_{m+x}-e_{m+x+2}+fd_{m+x+2}$ | $frot_{m+x-2}+fest_{m+x-2,\,m+x}$ $-fest_{m+x,\,m+x}$ $=e_{MSm}-e_{BSm+x}-fd_m$ | $e_{BSm+x}+frot_{m+x}=e_{MSm}-fd_m$ |

FIG.4

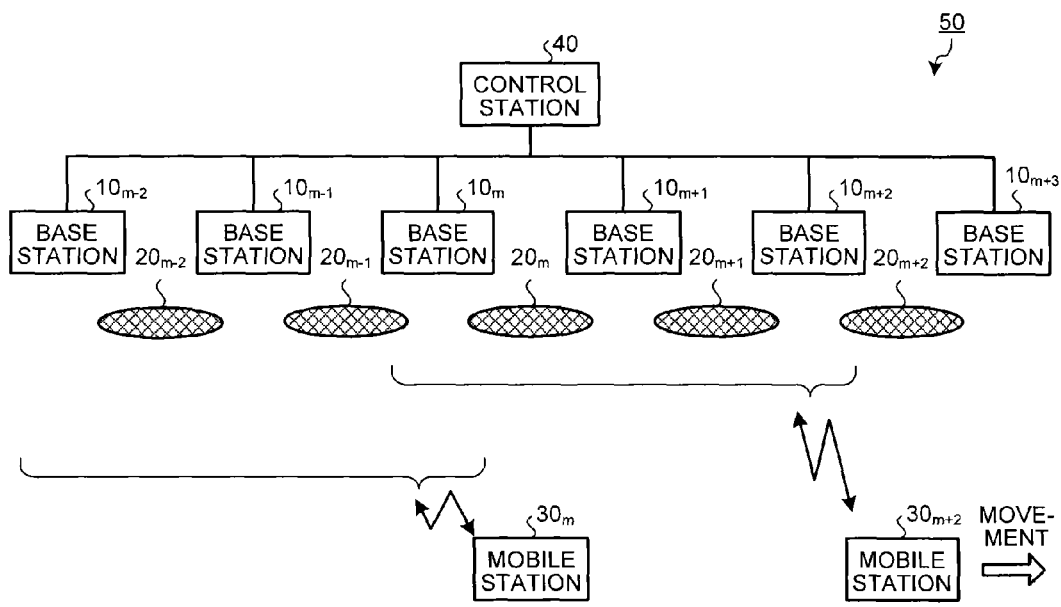

FIG.5

| | FREQUENCY OFFSET VALUE DETECTED FROM RECEPTION SIGNAL FROM MOBILE STATION $30_j$ BY BASE STATION $10_i$ $fest_{i,j}$ | TRANSMISSION PHASE-ROTATION AMOUNT OF BASE STATION $10_i$ (FREQUENCY REPRESENTATION) $frot_i$ | TRANSMISSION FREQUENCY ERROR OF THE BASE STATION $10_i$ AFTER TRANSMISSION-SIGNAL PHASE-ROTATION $e'_{BSi}$ |
|---|---|---|---|
| BASE STATION $10_{m-2}$ | $fest_{m-2,m} = e_{BSm-2} - e_{MSm} + fd_m$ | $-fest_{m-2,m}$ | $e_{BSm-2} + frot_{m-2} = e_{MSm} - fd_m$ |
| BASE STATION $10_{m-1}$ | $fest_{m-1,m} = e_{BSm-1} - e_{MSm} + fd_m$ | $-fest_{m-1,m}$ | $e_{BSm-1} + frot_{m-1} = e_{MSm} - fd_m$ |
| BASE STATION $10_m$ | $fest_{m,m} = e_{BSm} - e_{MSm} + fd_m$<br>$fest_{m,m+2} = e_{BSm} - e_{MSm+2} + fd_{m+2}$ | $-fest_{m,m}$ | $e_{BSm} + frot_m = e_{MSm} - fd_m$ |
| BASE STATION $10_{m+1}$ | $fest_{m+1,m+2} = e_{BSm+1} - e_{MSm+2} + fd_{m+2}$ | $frot_m + fest_{m,m+2}$<br>$-fest_{m+1,m+2}$<br>$= e_{MSm} - e_{BSm+1} - fd_m$ | $e_{BSm+1} + frot_{m+1} = e_{MSm} - fd_m$ |
| BASE STATION $10_{m+2}$ | $fest_{m+2,m+2} = e_{BSm+2} - e_{MSm+2} + fd_{m+2}$<br>$fest_{m+2,m+4} = e_{BSm+2} - e_{MSm+4} + fd_{m+4}$ | $frot_m + fest_{m,m+2}$<br>$-fest_{m+2,m+2}$<br>$= e_{MSm} - e_{BSm+2} - fd_m$ | $e_{BSm+2} + frot_{m+2} = e_{MSm} - fd_m$ |
| BASE STATION $10_{m+x}$ (x: ODD NUMBER) | $fest_{m+x,m+x+1} = e_{BSm+x} - e_{MSm+x+1} + fd_{m+x+1}$ | $frot_{m+x-1} + fest_{m+x-1,m+x+1}$<br>$-fest_{m+x,m+x+1}$<br>$= e_{MSm} - e_{BSm+x} - fd_m$ | $e_{BSm+x} + frot_{m+x} = e_{MSm} - fd_m$ |
| BASE STATION $10_{m+x}$ (x: EVEN NUMBER) | $fest_{m+x,m+x} = e_{BSm+x} - e_{MSm+x} + fd_{m+x}$<br>$fest_{m+x,m+x+2} = e_{m+x} - e_{m+x+2} + fd_{m+x+2}$ | $frot_{m+x-2} + fest_{m+x-2,m+x}$<br>$-fest_{m+x,m+x}$<br>$= e_{MSm} - e_{BSm+x} - fd_m$ | $e_{BSm+x} + frot_{m+x} = e_{MSm} - fd_m$ |

FIG.6

| | FREQUENCY OFFSET VALUE DETECTED FROM RECEPTION SIGNAL FROM MOBILE STATION $30_j$ BY BASE STATION $10_j$ $fest_{i,j}$ | TRANSMISSION PHASE-ROTATION AMOUNT OF BASE STATION $10_i$ (FREQUENCY REPRESENTATION) $frot_i$ | TRANSMISSION FREQUENCY ERROR OF THE BASE STATION $10_i$ AFTER TRANSMISSION-SIGNAL PHASE-ROTATION $e'_{BSi}$ |
|---|---|---|---|
| BASE STATION $10_{m-2}$ | $fest_{m-2,\,m} = e_{BSm-2} - e_{MSm} + fd_m$ | $frot_m + fest_{m,\,m}$ $-fest_{m-2,\,m}$ | $e_{BSm-2} + frot_{m-2}$ $= a \times (e_{MSm} - fd_m)$ $+ b \times (e_{MSm+1} - fd_{m+1})$ $+ c \times (e_{MSm+2} - fd_{m+2})$ |
| BASE STATION $10_{m-1}$ | $fest_{m-1,\,m} = e_{BSm-1} - e_{MSm} + fd_m$ $fest_{m-1,\,m+1} = e_{BSm-1} - e_{MSm+1} + fd_{m+1}$ | $frot_m + fest_{m,\,m}$ $-fest_{m-1,\,m}$ | $e_{BSm-1} + frot_{m-1}$ $= a \times (e_{MSm} - fd_m)$ $+ b \times (e_{MSm+1} - fd_{m+1})$ $+ c \times (e_{MSm+2} - fd_{m+2})$ |
| BASE STATION $10_m$ | $fest_{m,\,m} = e_{BSm} - e_{MSm} + fd_m$ $fest_{m,\,m+1} = e_{BSm} - e_{MSm+1} + fd_{m+1}$ $fest_{m,\,m+2} = e_{BSm} - e_{MSm+2} + fd_{m+2}$ | $-a \times fest_{m,\,m}$ $-b \times fest_{m,\,m+1}$ $-c \times fest_{m,\,m+2}$ | $e_{BSm} + frot_m$ $= a \times (e_{MSm} - fd_m)$ $+ b \times (e_{MSm+1} - fd_{m+1})$ $+ c \times (e_{MSm+2} - fd_{m+2})$ |
| BASE STATION $10_{m+1}$ | $fest_{m+1,\,m+1} = e_{BSm+1} - e_{MSm+1} + fd_{m+1}$ $fest_{m+1,\,m+2} = e_{BSm+1} - e_{MSm+2} + fd_{m+2}$ $fest_{m+1,\,m+3} = e_{BSm+1} - e_{MSm+3} + fd_{m+3}$ | $frot_m + fest_{m,\,m+1}$ $-fest_{m+1,\,m+1}$ | $e_{BSm+1} + frot_{m+1}$ $= a \times (e_{MSm} - fd_m)$ $+ b \times (e_{MSm+1} - fd_{m+1})$ $+ c \times (e_{MSm+2} - fd_{m+2})$ |
| BASE STATION $10_{m+2}$ | $fest_{m+2,\,m+2} = e_{BSm+2} - e_{MSm+2} + fd_{m+2}$ $fest_{m+2,\,m+3} = e_{BSm+2} - e_{MSm+3} + fd_{m+3}$ $fest_{m+2,\,m+4} = e_{BSm+2} - e_{MSm+4} + fd_{m+4}$ | $frot_m + fest_{m,\,m+2}$ $-fest_{m+2,\,m+2}$ | $e_{BSm+2} + frot_{m+2}$ $= a \times (e_{MSm} - fd_m)$ $+ b \times (e_{MSm+1} - fd_{m+1})$ $+ c \times (e_{MSm+2} - fd_{m+2})$ |
| BASE STATION $10_{m+x}$ (x: ODD NUMBER) | $fest_{m+x,\,m+x} = e_{BSm+x} - e_{MSm+x} + fd_{m+x}$ $fest_{m+x,\,m+x+1} = e_{BSm+x} - e_{MSm+x+1} + fd_{m+x+1}$ $fest_{m+x,\,m+x+2} = e_{m+x} - e_{m+x+2} + fd_{m+x+2}$ | $frot_{m+x-1} + fest_{m+x-1,\,m+x}$ $-fest_{m+x,\,m+x}$ | $e_{BSm+x} + frot_{m+x}$ $= a \times (e_{MSm} - fd_m)$ $+ b \times (e_{MSm+1} - fd_{m+1})$ $+ c \times (e_{MSm+2} - fd_{m+2})$ |
| BASE STATION $10_{m+x}$ (x: EVEN NUMBER) | $fest_{m+x,\,m+x} = e_{BSm+x} - e_{MSm+x} + fd_{m+x}$ $fest_{m+x,\,m+x+1} = e_{BSm+x} - e_{MSm+x+1} + fd_{m+x+1}$ $fest_{m+x,\,m+x+2} = e_{m+x} - e_{m+x+2} + fd_{m+x+2}$ | $frot_{m+x-2} + fest_{m+x-2,\,m+x}$ $-fest_{m+x,\,m+x}$ | $e_{BSm+x} + frot_{m+x}$ $= a \times (e_{MSm} - fd_m)$ $+ b \times (e_{MSm+1} - fd_{m+1})$ $+ c \times (e_{MSm+2} - fd_{m+2})$ |

BASE-STATION CONTROL DEVICE, WIRELESS COMMUNICATION SYSTEM, AND BASE STATION

FIELD

The present invention relates to a wireless communication system in which a plurality of base stations perform transmission to a mobile station at the same time and the same frequency.

BACKGROUND

In a wireless communication system in which transmission from a plurality of base stations is performed at the same time and the same frequency, transmission frequencies of all the base stations are the same. In practice, however, frequency errors of oscillators of the respective base stations are different from each other, and thus the transmission frequency of each of the base stations is a frequency having a respectively different offset (an error) from an ideal frequency. Therefore, a reception signal of a mobile station is a signal in which a plurality of signals having different frequency offsets are superposed. In the mobile station, it is difficult to perform frequency offset compensation on a combined wave serving as a reception wave in which a plurality of signals having different frequency offsets are superposed on each other, and thus the reception characteristics of the mobile station are degraded.

Patent Literature 1 discloses an invention of cancelling the frequency offset described above. In a mobile communication system described in Patent Literature 1, a base station detects a frequency offset from a reception signal from a mobile station and performs complex multiplication of a phase opposite to a phase of the detected frequency offset with a transmission signal in a time domain, that is, performs phase rotation on a transmission signal, thereby executing frequency control of the transmission signal. In this way, a frequency offset between each base station and a mobile station can be cancelled, and thus when transmission is performed from a plurality of base stations to a mobile station at the same frequency, a reception wave of the mobile station is a combined wave in which signals having a frequency offset of 0 are superposed on each other, and it is possible to suppress degradation in the reception characteristics of the mobile station.

CITATION LIST

Patent Literature

Patent Literature 1: Japanese Patent No. 4699843

SUMMARY

Technical Problem

However, the invention of Patent Literature 1 cannot be applied to a wireless communication system in which a base station performs transmission to a plurality of mobile stations at the same time and the same frequency.

In the invention described in Patent Literature 1, as a phase rotation amount of a transmission signal in a base station that is described above, a different value is used for a transmission signal of each mobile station. That is, a process of cancelling a frequency offset is performed on an individual channel. Accordingly, when the base station performs transmission to a plurality of mobile stations at the same time and the same frequency, the base station cannot perform phase rotation of a transmission signal using a phase rotation amount that is different for each mobile station as described above. For this reason, a reception signal of a mobile station is a signal in which signals from a plurality of base stations that have different frequency offsets from each other are superposed. Therefore, it is difficult to perform frequency offset compensation in the mobile station and the reception characteristics of the mobile station are degraded.

The present invention has been achieved in view of the above problems, and an object of the present invention is to provide a base-station control device that can suppress degradation in the reception characteristics of a mobile station due to an oscillator frequency error between base stations in a wireless communication system in which a plurality of base stations perform transmission to a plurality of mobile stations at the same time and the same frequency, a wireless communication system, and a base station.

Solution to Problem

To solve the problems described above and accomplish the object, the present invention provides a base-station control device that issues an operation instruction to each of base stations in a wireless communication system in which a plurality of the base stations perform transmission at a same time and a same frequency, wherein a frequency offset of a reception signal from a mobile station that is detected by each of the base stations is collected, and a phase rotation amount that is a rotation amount when the base stations rotate a phase of a transmission signal is determined for each of the base stations so that frequency offsets of respective transmission signals having been subjected to phase rotation by the respective base stations are same.

Advantageous Effects of Invention

According to the present invention, signals that are transmitted from a plurality of base stations at the same time and the same frequency reach a mobile station as a combined wave in which a plurality of signals having the same frequency offsets are superposed on each other. Therefore, it is possible to perform frequency offset compensation in the mobile station and the reception characteristics of the mobile station can be improved.

BRIEF DESCRIPTION OF DRAWINGS

FIG. 3 is a diagram illustrating a calculation result of a transmission phase-rotation amount.

FIG. 4 is an explanatory diagram of an operation of the wireless communication system according to the present invention.

FIG. 5 is a diagram illustrating a calculation result of a transmission phase-rotation amount.

FIG. 6 is a diagram illustrating a calculation result of a transmission phase-rotation amount.

DESCRIPTION OF EMBODIMENTS

Exemplary embodiments of a base-station control device, a wireless communication system, and a base station according to the present invention will be described below in detail with reference to the accompanying drawings. The present invention is not limited to the embodiments.

First Embodiment

Figure 1:
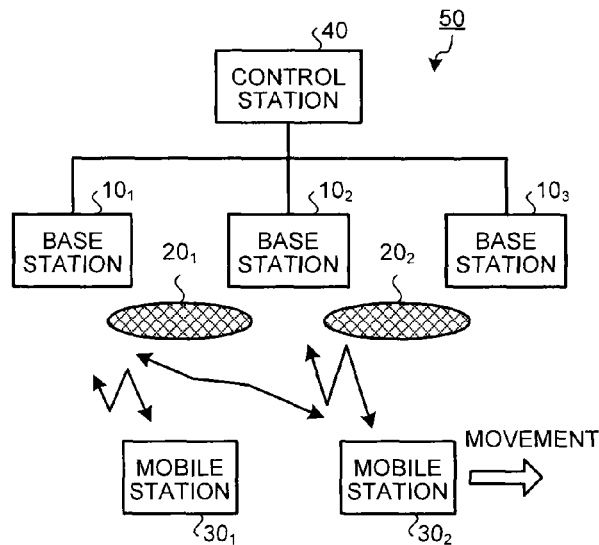
FIG. 1 is a diagram illustrating a configuration example of a wireless communication system according to the present invention.

FIG. 1 is a diagram illustrating a configuration example of a wireless communication system according to the present invention. A wireless communication system 50 is constituted by including a plurality of base stations $10_i$ (i is an integer) that perform wireless communication with mobile stations $30_j$ (j is an integer) and a control station 40 that individually issues an instruction to the respective base stations $10_i$ regarding a frequency adjustment amount of a transmission signal. It is assumed that time synchronization is established among the respective base stations $10_i$. While the control station 40 is connected to the plurality of base stations $10_i$ through wires in FIG. 1, any connection method other than wired connection may be used.

The plurality of base stations $10_i$ perform transmission to the mobile stations $30_j$ at the same time and the same frequency. The base station $10_i$ receives a wireless signal from each of the plurality of mobile stations $30_j$ and detects a frequency offset (an error between an ideal frequency of a reception signal and an actual frequency thereof) from a reception signal. It is assumed that the base station $10_i$ can detect the frequency offset for each one of the mobile stations $30_j$. The base station $10_i$ notifies the control station 40 of a frequency offset value that is detected for each mobile station $30_j$ or of a phase amount corresponding to a detected frequency offset value. It is assumed that the base stations $10_i$ are installed at a regular interval and the mobile stations $30_j$ move along an installation direction of the base stations. Further, it is assumed that all antennas of the base stations $10_i$ and the mobile stations $30_j$ are a directional antenna and the antennas perform radio transmission and reception only in a single direction.

The control station 40 serving as a base-station control device according to the present invention calculates a phase rotation amount to be added to a transmission signal of the base station $10_i$ from: a frequency offset value of each mobile station $30_j$ or a phase amount corresponding to the frequency offset value that is notified from the base station $10_i$; and position information of the mobile station $30_j$, and notifies the base station $10_i$ of the calculated phase rotation amount. At this time, the control station 40 determines the phase rotation amount to be added to a transmission signal of the base station $10_i$ so that frequency errors of all the base stations $10_i$ that are communicable with an arbitrary mobile station $30_j$ are equal to each other. It is assumed that in the control station 40, the position information of the mobile station $30_j$ is known. A method of calculating a phase rotation amount in the control station 40 will be described later.

The base station $10_i$ adds a phase rotation amount that is notified from the control station 40 to a transmission signal and transmits this signal to the mobile station $30_j$. That is, assuming that a before-phase-rotation baseband transmission signal of the base station $10_i$ at time t is denoted by $s_i(t)$ and a phase rotation amount that is notified from the control station 40 to the base station $10_i$ is denoted by $\theta_i(t)$, an after-phase-rotation baseband transmission signal $x_i(t)$ of the base station $10_i$ can be represented as the complex multiplication of $s_i(t)$ and $\exp(j\theta_i(t))$ as in the following formula (1).

$$x_i(t) = s_i(t) \otimes \exp(j\theta_i(t)) \quad \text{[Formula 1]}$$

(j denotes an imaginary unit and $\otimes$ denotes complex multiplication.)

Next, a method of calculating a phase rotation amount (a phase rotation amount that is added to a transmission signal by the base station $10_i$, hereinafter, "transmission phase-rotation amount") in the control station 40 is described in detail. To simplify the descriptions, it is assumed that the number of mobile stations that are present between base stations is 1 at most. Further, it is assumed that the communicable distance both of the base station $10_i$ and the mobile station $30_j$ is three times the distance between base stations, and the base station $10_1$ orients the maximum gain direction of its antenna toward a movement direction of the mobile station $30_j$, while the mobile station $30_j$ orients the maximum gain direction of its antenna toward a direction opposite to the movement direction of the mobile station $30_j$. An index i of the base station $10_i$ is increased by 1 along the movement direction of the mobile station $30_j$. It is assumed that an inter-base station area between the base station $10_i$ and a base station $10_{i+1}$ is an inter-base station area $20_i$, and a mobile station that is present in the inter-base station area $20_i$ is a mobile station $30_i$. That is, the mobile station $30_j$ is communicable with base stations $10_j$, $10_{j-1}$, and $10_{j-2}$.

A method of calculating a phase rotation amount in a case where the mobile station $30_j$ is present in the inter-base station area $20_j$ (j≥m) in a wireless communication system having a configuration illustrated in FIG. 2 will be described as an example. An operation that the control station 40 determines a transmission phase-rotation amount of the base station $10_i$ so that a frequency error of the base station $10_i$ (i≥m−2) matches a frequency error of a mobile station $30_m$ will be described below.

As described above, base stations $10_{m-2}$, $10_{m-1}$, and $10_m$ are communicable with the mobile station $30_m$. The control station 40 determines a transmission phase-rotation amount of each of the base stations $10_{m-2}$, $10_{m-1}$, and $10_m$ so that a frequency offset that is detected from a reception signal from the mobile station $30_m$ is cancelled. That is, the control station 40 sets the transmission phase-rotation amount of each of the base stations $10_{m-2}$, $10_{m-1}$, and $10_m$ to have a phase opposite to a phase corresponding to a frequency offset value that is detected from a reception signal from the mobile station $30_m$ by the respective base stations $10_{m-2}$, $10_{m-1}$, and $10_m$. Transmission frequency errors of the base stations $10_{m-2}$, $10_{m-1}$, and $10_m$ are thus equal to each other. Next, the control station 40 successively calculates a transmission phase-rotation amount of the base station $10_i$ (i>m) from i=m+1 so that a transmission frequency error of the base station $10_i$ is equal to a transmission frequency error of the base station $10_m$. The calculation is described below in detail.

It is assumed that a frequency error of an oscillator of the base station $10_i$ is denoted by $e_{BSi}$ and a frequency error of an oscillator of the mobile station $30_j$ is denoted by $e_{MSj}$. Further, it is assumed that a Doppler shift that is generated accompanying the movement of the mobile station $30_j$ is denoted by $fd_j$. A mobile station antenna is a directional antenna, and thus Doppler broadening accompanying the movement of the mobile station $30_j$ is negligibly small. Accordingly, it is assumed that Doppler shifts $fd_j$ that are observed in the respective base stations $10_i$ are equal to each other. Thus, when an ideal value of the transmission frequency of each base station $10_i$ is denoted by f1, the transmission frequency of the base station $10_i$ can be represented as $f1+e_{BSi}$. When a frequency offset value that is detected from a reception signal from the mobile station $30_j$ by the base station $10_i$ is denoted by $fest_{i,j}$, it becomes $\text{fest}_{i,j} = e_{BSi} - e_{MSj} + fd_j$. Further, it is assumed that a frequency representation of the transmission phase-rotation amount of the base station $10_i$ that is calculated by the control station 40 is denoted by $\text{frot}_i$, and a transmission frequency error of the base station $10_i$ after transmission-signal phase-rotation is denoted by $e'_{BSi}$.

As described above, in the base station $10_{m-2}$, a frequency offset value $\text{fest}_{m-2,m}$ that is detected from a reception signal from the mobile station $30_m$ is $\text{fest}_{m-2,m} = e_{BSm-2} - e_{MSm} + fd_m$. The control station 40 sets a transmission phase-rotation amount of the base station $10_{m-2}$ to have a phase opposite to a phase corresponding to $\text{fest}_{m-2,m}$, that is, to be a phase amount corresponding to $\text{frot}_{m-2} = -\text{fest}_{m-2,m} = -(e_{BSm-2} - e_{MSm} + fd_m)$. At this time, a transmission frequency error $e'_{BSm-2}$ of the base station $10_{m-2}$ after transmission-signal phase-rotation is $e'_{BSm-2} = e_{BSm-2} + \text{frot}_{m-2} = e_{BSm-2} - (e_{BSm-2} - e_{MSm} + fd_m) = e_{MSm} - f_{dm}$.

Similarly, a transmission frequency error $e'_{BSm-1}$ of the base station $10_{m-1}$ after transmission-signal phase-rotation is $e'_{BSm-1} = e_{BSm-1} + \text{frot}_{m-1} = e_{BSm-1} - (e_{BSm-1} - e_{MSm} + fd_m) = e_{MSm} - fd_m$, and a transmission frequency error $e'_{BSm}$ of the base station $10_m$ after transmission-signal phase-rotation is $e'_{BSm} = e_{BSm} + \text{frot}_m = e_{BSm} - (e_{BSm} - e_{MSm} + fd_m) = e_{MSm} - f_{dm}$. The transmission frequency errors of the respective base stations $10_{m-2}$, $10_{m-1}$, and $10_m$ after transmission-signal phase-rotation are thus equal to each other ($e'_{BSm-2} = e'_{BSm-1} = e'_{BSm}$).

The control station 40 then determines a transmission phase-rotation amount of a base station $10_{m+1}$ so that a transmission frequency error $e'_{BSm+1}$ of the base station $10_{m+1}$ is equal to the transmission frequency error $e'_{BSm}$ of the base station $10_m$. Under conditions of FIG. 2, if it becomes $\text{frot}_{m+1} = \text{frot}_{m-1} + \text{fest}_{m-1,m+1} - \text{fest}_{m+1,m+1}$, the transmission frequency error $e'_{BSm+1}$ of the base station $10_{m+1}$ can be $e'_{BSm+1} = e_{BSm} + \text{frot}_{m+1} = e_{MSm} - fd_m = e'_{BSm}$. Therefore, the control station 40 may set a transmission phase-rotation amount of the base station $10_{m+1}$ to be a phase amount corresponding to $\text{frot}_{m+1} = \text{frot}_{m-1} + \text{fest}_{m-1,m+1} - \text{fest}_{m+1,m+1}$.

Next, the control station 40 sets a transmission phase-rotation amount of a base station $10_{m+2}$ so that a transmission frequency error $e'_{BSm+2}$ of the base station $10_{m+2}$ is equal to the transmission frequency error $e'_{BSm}$ of the base station $10_m$. Under the conditions of FIG. 2, if it becomes $\text{frot}_{m+2} = \text{frot}_m + \text{fest}_{m,m+2} - \text{fest}_{m+2,m+2}$, the transmission frequency error $e'_{BSm+2}$ of the base station $10_{m+2}$ can be $e'_{BSm+2} = e_{BSm+2} + \text{frot}_{m+2} = e_{MSm} - fd_m = e_{BSm}$. Therefore, the control station 40 may set the transmission phase-rotation amount of the base station $10_{m+2}$ to be a phase amount corresponding to $\text{frot}_{m+2} = \text{frot}_m + \text{fest}_{m,m+2} - \text{fest}_{m+2,m+2}$.

Similarly, the control station 40 successively calculates a transmission phase-rotation amount of a base station $10_{m+3}$, a transmission phase-rotation amount of a base station $10_{m+4}$, and the like. As illustrated in FIG. 3, the control station 40 may set a transmission phase-rotation amount of a base station $10_{m+x}$ to be a phase amount corresponding to $\text{frot}_{m+x} = \text{frot}_{m+x-2} + \text{fest}_{m+x-2,m+x} - \text{fest}_{m+x,m+x}$.

A method of calculating a phase rotation amount in a case where the mobile station $30_j$ is present in the inter-base station area 209 ($j \geq m$, j is an even number) is described as another example as illustrated in FIG. 4. Similarly to the case of FIG. 2, when the control station 40 determines the transmission phase-rotation amount of the base station $10_i$ so that a frequency error of the base station $10_i$ ($i \geq m-2$) matches a frequency error of the mobile station $30_m$; a frequency offset detection value $\text{fest}_{i,j}$ of the base station $10_i$, the frequency representation $\text{frot}_i$ of the transmission phase-rotation amount of the base station $10_i$ that is calculated by the control station 40, and the transmission frequency error $e'_{BSi}$ of the base station $10_i$ after transmission-signal phase-rotation are as illustrated in FIG. 5. The method will be described below in detail.

As described above, the base stations $10_{m-2}$, $10_{m-1}$, and $10_m$ are communicable with the mobile station $30_m$. Similarly to the case of FIG. 2, the control station 40 determines the transmission phase-rotation amount of each of the base stations $10_{m-2}$, $10_{m-1}$, and $10_m$ so that a frequency offset that is detected from a reception signal from the mobile station $30_m$ is cancelled. That is, the control station 40 sets the transmission phase-rotation amount of each of the base stations $10_{m-2}$, $10_{m-1}$, and $10_m$ to have a phase opposite to a phase corresponding to a frequency offset value that is detected from a reception signal from the mobile station $30_m$ by the respective base stations $10_{m-2}$, $10_{m-1}$, and $10_m$. Transmission frequency errors of the base stations $10_{m-2}$, $10_{m-1}$, and $10_m$ are thus equal to each other. Next, the control station 40 successively calculates the transmission phase-rotation amount of the base station $10_i$ (i>m) from i=m+1 so that a transmission frequency error of the base station $10_i$ is equal to a transmission frequency error of the base station $10_m$. The successive calculation will be described below in detail.

Figure 2:
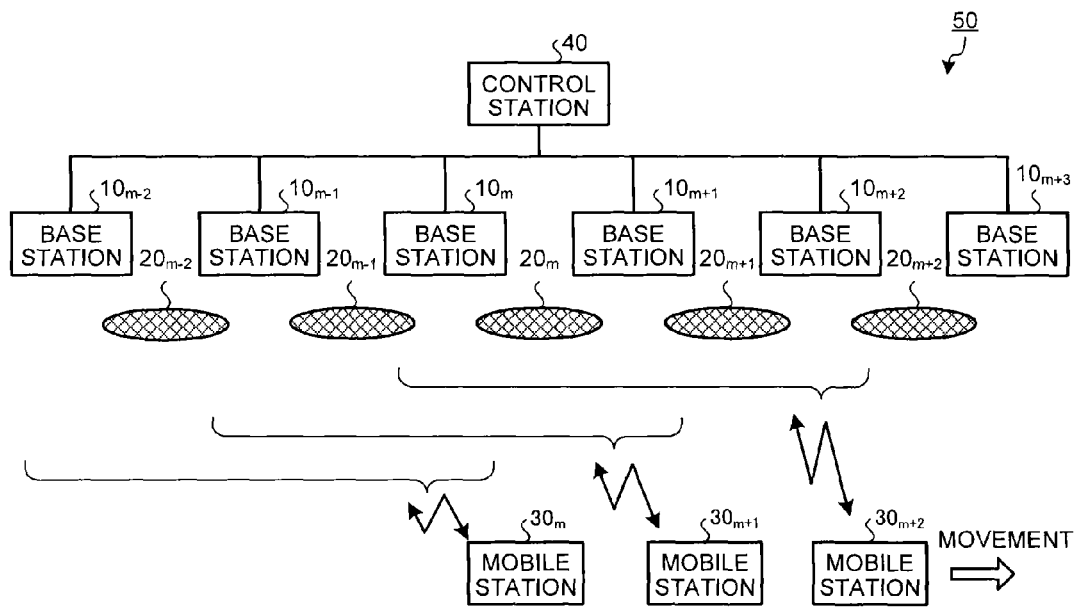
FIG. 2 is an explanatory diagram of an operation of the wireless communication system according to the present invention.

A method of calculating the transmission phase-rotation amount of the base stations $10_{m-2}$, $10_{m-1}$, and $10_m$ is identical to that of the case of FIG. 2 described above, and thus descriptions thereof will be omitted.

After calculating the transmission phase-rotation amount of the base stations $10_{m-2}$, $10_{m-1}$, and $10_m$, the control station 40 determines the transmission phase-rotation amount of the base station $10_{m+1}$ so that the transmission frequency error $e'_{BSm+1}$ of the base station $10_{m+1}$ is equal to the transmission frequency error $e'_{BSm}$ of the base station $10_m$. In the case of FIG. 4, if it becomes $\text{frot}_{m+1} = \text{frot}_m + \text{fest}_{m,m+2} - \text{fest}_{m+1,m+2}$, the transmission frequency error $e'_{BSm+1}$ of the base station $10_{m+1}$ can be $e'_{BSm+1} = e_{BSm+1} + \text{frot}_{m+1} = e_{MSm} - fd_m = e'_{BSm}$. Therefore, the control station 40 may set the transmission phase-rotation amount of the base station $10_{m+1}$ to be a phase amount corresponding to $\text{frot}_{m+1} = \text{frot}_m + \text{fest}_{m,m+2} - \text{fest}_{m+1,m+2}$.

The control station 40 then determines the transmission phase-rotation amount of the base station $10_{m+2}$ so that the transmission frequency error $e'_{BSm+2}$ of the base station $10_{m+2}$ is equal to the transmission frequency error $e'_{BSm}$ of the base station $10_m$. Under conditions of FIG. 4, if it becomes $\text{frot}_{m+2} = \text{frot}_m + \text{fest}_{m,m+2} - \text{fest}_{m+2,m+2}$, the transmission frequency error $e'_{BSm+2}$ of the base station $10_{m+2}$ can be $e'_{BSm+2} = e_{BSm+2} + \text{frot}_{m+2} = e_{MSm} - fd_m = e'_{BSm}$. Therefore, the control station 40 may set the transmission phase-rotation amount of the base station $10_{m+2}$ to be a phase amount corresponding to $\text{frot}_{m+2} = \text{frot}_m + \text{fest}_{m,m+2} - \text{fest}_{m+2,m+2}$.

Similarly, the control station 40 successively calculates the transmission phase-rotation amount of the base station $10_{m+3}$, the transmission phase-rotation amount of the base station $10_{m+4}$, and the like. As illustrated in FIG. 5, the control station 40 may set the transmission phase-rotation amount of the base station $10_{m+x}$ to be a phase amount corresponding to $\text{frot}_{m+x} = \text{frot}_{m+x-1} + \text{fest}_{m+x-1,m+x+1} - \text{fest}_{m+x,m+x+1}$ when x is an odd number and to be a phase amount corresponding to $\text{frot}_{m+x} = \text{frot}_{m+x-2} + \text{fest}_{m+x-2,m+x} - \text{fest}_{m+x,m+x}$ when x is an even number.

As described above, in the wireless communication system according to the present embodiment, a control station adjusts a transmission frequency of each base station so that transmission frequency errors of a plurality of base stations are respectively equal to a frequency error of a mobile station serving as a reference. Thus signals that are transmitted from the base stations at the same time and the same frequency thus reach a mobile station as a combined wave in which a plurality of signals having the same frequency offsets are superposed on each other. Accordingly, it is possible to perform frequency offset compensation in the mobile station and the reception characteristics of the mobile station can be improved.

The above example has described a method of matching a transmission frequency error of each base station with a frequency error of the mobile station $30_m$ by using a case where the mobile station $30_j$ is present in the inter-base station area $20_9$ (j≥m), but is not present in the inter-base station area $20_j$ (j<m) as an example. However, the present invention is not limited thereto, and a mobile station serving as a reference can be selected by any method. For example, even if the transmission frequency error of each base station is caused to match the frequency error of the mobile station $30_m$ in a case where the mobile station $30_j$ is present in the inter-base station area $20_j$ (j≤m), but is not present in the inter-base station area $20_j$ (j>m), effects that are identical to those of the case described above can be obtained.

Second Embodiment

While the first embodiment has described an example in which a transmission frequency error of each base station is caused to match a frequency error of a mobile station, the present invention is not limited thereto. It is permissible to cause the transmission frequency error of each base station to match a weighted addition value of frequency errors of a plurality of mobile stations. This will be described by using a case of FIG. 2 as an example.

With reference to FIG. 2, an example in which the control station 40 causes a transmission frequency error of each base station to match a weighted addition value of frequency errors of the mobile stations $30_m$, $30_{m+1}$, and $30_{m+2}$ will be described below. The control station 40 determines a transmission phase-rotation amount of the base station $10_m$ so that a frequency offset that is detected from a reception signal from each of the mobile stations $30_m$, $30_{m+1}$, and $30_{m+2}$ is cancelled. Assuming that a, b, and c are values such that a+b+c=1.0 is satisfied and each value is equal to or larger than 0, as illustrated in FIG. 6, the control station 40 sets the transmission phase-rotation amount of the base station $10_m$ to be a phase amount corresponding to $frot_m=-a\times fest_{m,m}-b\times fest_{m,m+1}-c\times fest_{m,m+2}$. At this time, the transmission frequency error $e'_{BSm}$ of the base station $10_m$ after transmission-signal phase-rotation is $e'_{Bsm}=e_{Bsm}+frot_m=a\times(e_{MSm}-fd_m)+b\times(e_{Msm+i}-fd_{m+1})+c\times(e_{Msm+2}-fd_{m+2})$. Assuming that a=1, b=0, and c=0, this error is the same as that of the example described above in which a transmission frequency error of each base station is caused to match a frequency error of the mobile station $30_m$.

Next, the control station 40 determines a transmission phase-rotation amount of the base station $10_{m-1}$ so that the transmission frequency error $e'_{BSm-1}$ of the base station $10_{m-1}$ is equal to the transmission frequency error $e'_{BSm}$ of the base station $10_m$. In this example, if it becomes $frot_{m-1}=frot_m+fest_{m,m}-fest_{m-1,m}$, the transmission frequency error $e'_{BSm-1}$ of the base station $10_{m-1}$ can be equal to the transmission frequency error e'BSm of the base station $10_m$, such as $e'_{BSm-1}=e_{BSm-1}+frot_{m-1}=a\times(e_{MSm}-fd_m)+b\times(e_{MSm+1}-fd_{m+1})+c\times(e_{MSm+2}-fd_{m+2})=e'_{BSm}$. Therefore, the control station 40 may set the transmission phase-rotation amount of the base station $10_{m-1}$ to be a phase amount corresponding to $frot_{m-1}=frot_m+fest_{m,m}-fest_{m-1,m}$.

Subsequently, the control station 40 determines the transmission phase-rotation amount of the base station $10_{m-2}$ so that the transmission frequency error $e'_{BSm-2}$ of the base station $10_{m-2}$ is equal to the transmission frequency error $e'_{BSm}$ of the base station $10_m$. In this example, if it becomes $frot_{m-2}=frot_m+fest_{m,m}-fest_{m-2,m}$, the transmission frequency error $e'_{BSm-2}$ of the base station $10_{m-2}$ can be equal to the transmission frequency error $e'_{BSm}$ of the base station $10_m$, such as $e'_{BSm-2}=e_{BSm-2}+frot_{m-2}=a\times(e_{MSm}-fd_m)+b\times(e_{MSm+1}-fd_{m+1})+c\times(e_{MSm+2}-fd_{m+2})=e'_{BSm}$. Therefore, the control station 40 may set the transmission phase-rotation amount of the base station $10_{m-2}$ to be a phase amount corresponding to $frot_{m-2}=frot_m+fest_{m,m}-fest_{m-2,m}$.

Next, the control station 40 determines the transmission phase-rotation amount of the base station $10_{m+1}$ so that the transmission frequency error $e'_{BSm+1}$ of the base station $10_{m+1}$ is equal to the transmission frequency error $e'_{BSm}$ of the base station $10_m$. In this example, if it becomes $frot_{m+1}=frot_m+fest_{m,m+1}-fest_{m+1,m+1}$, the transmission frequency error $e'_{BSm+1}$ of the base station $10_{m+1}$ can be equal to the transmission frequency error $e'_{BSm}$ of the base station $10_m$, such as $e'_{BSm+1}=e_{BSm+1}+frot_{m+1}=a\times(e_{MSm}-fd_m)+b\times(e_{MSm+1}-fd_{m+1})+c\times(e_{MSm+2}-fd_{m+2})=e'_{BSm}$. Therefore, the control station 40 may set the transmission phase-rotation amount of the base station $10_{m+1}$ to be a phase amount corresponding to $frot_{m+1}=frot_m+fest_{m,m+1}-fest_{m+1,m+1}$.

Next, the control station 40 determines the transmission phase-rotation amount of the base station $10_{m+2}$ so that the transmission frequency error $e'_{BSm+2}$ of the base station $10_{m+2}$ is equal to the transmission frequency error $e'_{BSm}$ of the base station $10_m$. In this example, if it becomes $frot_{m+2}=frot_m+fest_{m,m+2}-fest_{m+2,m+2}$, the transmission frequency error $e'_{BSm+2}$ of the base station $10_{m+2}$ can be equal to the transmission frequency error $e'_{BSm}$ of the base station $10_m$, such as $e'_{BSm+2}=e_{BSm+2}+frot_{m+2}=a\times(e_{MSm}-fd_m)+b\times(e_{MSm+1}-fd_{m+1})+c\times(e_{MSm+2}-fd_{m+2})=e'_{BSm}$. Therefore, the control station 40 may set the transmission phase-rotation amount of the base station $10_{m+2}$ to be a phase amount corresponding to $frot_{m+2}=frot_m+fest_{m,m+2}-fest_{m+2,m+2}$.

Similarly, the control station 40 successively calculates a transmission phase-rotation amount of the base station $10_{m+3}$, a transmission phase-rotation amount of the base station $10_{m+4}$, and the like. As illustrated in FIG. 6, the control station 40 may set a transmission phase-rotation amount of the base station $10_{m+x}$ to be a phase amount corresponding to $frot_{m+x}=frot_{m+x-1}+fest_{m+x-1,m+x}-fest_{m+x,m+x}$ when x is an odd number and to be a phase amount corresponding to $frot_{m+x}=frot_{m+x-2}+fest_{m+x-2,m+x}-fest_{m+x,m+x}$ when x is an even number.

As described above, even if a weighted addition value of frequency errors of a plurality of mobile stations is used as a reference, a control station can adjust a transmission frequency of each base station so that transmission frequency errors of a plurality of base stations are respectively equal to the weighted addition value. Similarly to the wireless communication system according to the first embodiment, signals that are transmitted from the base stations at the same time and the same frequency thus reach a mobile station as a combined wave in which a plurality of signals having the same frequency offsets are superposed on each other, and it is possible to perform frequency offset compensation in the mobile station. That is, the reception characteristics of the mobile station can be improved.

While each of the embodiments has described an example in which the communicable distance (the reachable range of a transmission signal) of the base station $10_i$ and the mobile station $30_j$ is three times the distance between base stations, the present invention is not limited thereto. The present invention can be applied to any communicable distance, and effects that are identical to those of the example described above can be obtained.

To simplify descriptions, each of the embodiments has described that the base stations $10_i$ are installed at a regular interval. However, the present invention is not limited thereto and can be applied to any installation intervals, and effects that are identical to those of the example described above can be obtained.

While each of the embodiments has described that antennas of the base station $10_i$ and the mobile station $30_j$ are a directional antenna and this antenna performs radio transmission and reception only in a single direction, the present invention is not limited thereto. The present invention can also be applied to a case of performing radio transmission and reception in a plurality of directions, and effects that are identical to those of the example described above can be obtained.

While each of the embodiments has described that the number of mobile stations that are present between base stations is 1 at most, the present invention is not limited thereto. The present invention can also be applied to a case where a plurality of mobile stations are present between base stations, and effects that are identical to those of the example described above can be obtained.

While each of the embodiments has described that the control station 40 uses an instantaneous value of a frequency offset detected by each base station $10_i$, the present invention is not limited thereto. If a plurality of frequency offset detection values that are temporally continuous or in proximity to each other are averaged, effects equivalent to or better than those of the example described above can be obtained. When a control station can estimate the movement speed of the mobile station $30_j$, as frequency offset detection values in a case where the mobile station $30_j$ moves is moving at a constant speed are averaged, the precision of averaging mentioned above can be improved and thus the reception characteristics of a mobile station can be improved more than the example described above. The constant speed described above does not necessarily need to be constant speed, and it is permissible that a speed difference is present, in which a difference between the maximum Doppler shifts generated by the movement of the mobile station $30_j$ is equal to or less than a remaining frequency offset that can be demodulated by the mobile station $30_j$.

INDUSTRIAL APPLICABILITY

As described above, the present invention is useful as a control station (a base-station control device) that determines a frequency adjustment amount of a signal transmitted from each base station in a wireless communication system that includes a plurality of base stations that perform transmission at the same time and the same frequency.

REFERENCE SIGNS LIST $10_1$ to $10_3$, $10_{m-2}$ to $10_{m+3}$ base station, $20_1$, $20_2$, $20_{m-2}$ to $20_{m+2}$ inter-base station area, $30_1$, $30_2$, $30_m$ to $30_{m+2}$ mobile station, 40 control station, 50 wireless communication system.

The invention claimed is:

1. A base-station control device that issues an operation instruction to each of base stations in a wireless communication system in which a plurality of the base stations perform transmission at a same time and a same frequency, wherein:

the base-station control device is configured to collect, from each of the plurality of base stations, a frequency offset of a reception signal that is transmitted from a mobile station to the base stations and that is detected by each of the base stations; and the base-station control device is configured to determine a phase rotation amount that at least one of the base stations use to rotate a phase of a transmission signal to be transmitted by the at least one of the base stations, the base-station control device determines the phase rotation amount by using two or more of the frequency offsets detected by the base stations that are different from each other among a plurality of the frequency offsets collected from the base stations, or by using the frequency offsets of reception signals from two or more different mobile stations that are collected from one of the base stations.

2. The base-station control device according to claim 1, wherein the phase rotation amount is determined so that frequency offsets of respective transmission signals having been subjected to phase rotation by the respective base stations are same.

3. The base-station control device according to claim 1, wherein frequency offsets of reception signals from a plurality of predetermined mobile stations that are detected by the base station that is communicating with the predetermined mobile stations are obtained to perform weighted addition, and the phase rotation amount is determined by using an addition result as a reference.

4. The base-station control device according to claim 1, wherein the phase rotation amount is determined by using a determination method that is selected based on a position relationship between the base station and a mobile station.

5. A wireless communication system comprising:

a plurality of base stations that perform transmission at a same time and a same frequency; and a control station that controls the base stations, wherein each of the base stations detects a frequency offset of a reception signal received from a mobile station and notifies the control station of the detected frequency offset, and the control station determines a phase rotation amount that at least one of the base stations use to rotate a phase of a transmission signal to be transmitted by the at least one of the base stations, by using two or more of the frequency offsets detected by the base stations that are different from each other among a plurality of the frequency offsets notified from the plurality of base stations or by using the frequency offsets collected from the base stations and the frequency offsets of reception signals from two or more different mobile stations that are collected from one of the base stations.

6. The wireless communication system according to claim 5, wherein the phase rotation amount is determined so that frequency offsets of respective transmission signals having been subjected to phase rotation by respective base stations are same.

7. A base station in a wireless communication system, the wireless communication system including a plurality of base stations that perform transmission at a same time and a same frequency and a control station that controls the plurality of base stations so that frequency offsets of signals transmitted to a mobile station from the plurality of base stations are same, the base station comprising:

a frequency offset detection unit that detects a frequency offset of a reception signal received at the base station from the mobile station; and a frequency offset notification unit that notifies the control station of the frequency offset that is detected by the frequency offset detection unit as information that is used when the control station determines a phase rotation amount that at least one of the base stations use to rotate a phase of a transmission signal to be transmitted by the at least one of the base stations.

* * * * *